United States Patent
Belliard (10) Patent No.: US 12,370,727 B2
(45) Date of Patent: Jul. 29, 2025

(54) DEVICE FOR EJECTING A MOULD, COMPRISING A CHAIN WITH SLIDING LINKS AND AN ADJUSTMENT SHIM

(71) Applicant: FAURECIA INTERIEUR INDUSTRIE, Nanterre (FR)

(72) Inventor: Sylvain Belliard, Rouillon (FR)

(73) Assignee: FAURECIA INTERIEUR INDUSTRIE, Nanterre (FR)

(*) Notice: Subject to any disclaimer, the term of this patent is extended or adjusted under 35 U.S.C. 154(b) by 328 days.

(21) Appl. No.: 18/013,536

(22) PCT Filed: Jun. 29, 2021

(86) PCT No.: PCT/EP2021/067792
§ 371 (c)(1),
(2) Date: Dec. 28, 2022

(87) PCT Pub. No.: WO2022/002903
PCT Pub. Date: Jan. 6, 2022

(65) Prior Publication Data
US 2023/0321876 A1    Oct. 12, 2023

(30) Foreign Application Priority Data
Jun. 29, 2020   (FR) ..................................... 20 06783

(51) Int. Cl.
*B29C 33/44* (2006.01)
(52) U.S. Cl.
CPC ................. *B29C 33/442* (2013.01)

(58) Field of Classification Search
CPC ........ B29C 33/442; B29C 33/44; B29C 33/20
See application file for complete search history.

(56) References Cited

U.S. PATENT DOCUMENTS

2017/0246771 A1* 8/2017 Belliard ................ B29C 45/401

FOREIGN PATENT DOCUMENTS

| EP | 3210735 A1 | 8/2017 |
| FR | 3065388 A1 | 10/2018 |
| FR | 3073442 A1 | 5/2019 |

OTHER PUBLICATIONS

Written Opinion for PCT/EP2021/067792 with Machine translation into English, Sep. 15, 2021, 8 pages.
International Search Report translation into English for PCT/EP2021/067792, Sep. 15, 2021, 2 pages.

* cited by examiner

*Primary Examiner* — Alison L Hindenlang
*Assistant Examiner* — Erica Hartsell Funk
(74) *Attorney, Agent, or Firm* — Reising Ethington P.C.

(57) ABSTRACT

An ejection device having a pushing device that can be moved in translation along a first axis, an ejection element is translatable along a second axis different from the first axis, and a transfer device connecting the pushing device and the ejection element. The transfer device includes a transmission chain having at least two transmission links which are translatable in a sliding direction. The ejection device further includes an adjustment wedge mounted on the pushing device, the adjustment wedge having an adjustment surface forming an adjustment angle, with the transmission chain being mounted on the adjustment surface.

11 Claims, 12 Drawing Sheets

FIG.12

DEVICE FOR EJECTING A MOULD, COMPRISING A CHAIN WITH SLIDING LINKS AND AN ADJUSTMENT SHIM

TECHNICAL FIELD

The present invention relates to an ejection device for a mould for making a moulded article in a moulding cavity for enabling ejection of the moulded article from the moulding cavity, said device comprising:
- a pushing device that can be moved in translation along a first axis between a retracted position and an ejection position,
- at least one ejection element that can move in translation along a second axis, different from the first axis, between a retracted position and an ejection position,
- at least one transfer device connecting the pushing device and the ejection element, said transfer device being arranged to move the ejection element along the second axis between its retracted position and its ejection position when the pushing device is moved along the first axis between its retracted position and its ejection position, the transfer device comprising a transmission chain comprising at least two transmission links that can be moved in translation in a sliding direction with respect to each other and with respect to the pushing device and ejection element. Such an ejection device allows, for example, the demoulding of a complex shaped moulded article, e.g. a part which is not flat or which has areas extending in one or more planes other than a plane perpendicular to the direction of ejection or which has elements extending in a direction other than the direction of ejection or undercut areas. Indeed, by providing for example an ejection device comprising an ejection rod ejecting the part along the first axis and another rod forming the ejection element and ejecting the part along the second axis, a complex shaped part can be ejected.

BACKGROUND

Document EP-3 210 735 describes such an ejection device, in which it is provided that the links of the transmission chain are slid along sliding surfaces at an angle to a direction perpendicular to the first axis of movement of the transmission chain. The angle is chosen to synchronise the movement of the ejection element with that of the pushing device, in particular to accelerate or slow down the movement of the ejection element relative to that of the pushing device. Such synchronisation allows the movement of the ejection element to be adjusted relative to one or more other ejection rods also moved by the pushing device for demoulding other parts of the moulded article so that the ejection element and the ejection rods reach their ejection position at the same time while the movement paths of the ejection element and the other ejection rods between the retracted position and the ejection position are different.

However, this document does not describe a simple way of adjusting this angle so that it can be easily changed when the timing of the movement of the ejection element with respect to the pushing device needs to be changed.

SUMMARY

One of the aims of the invention is to overcome this disadvantage by providing an ejection device that allows the angle at which the links slide relative to each other to be changed simply.

To this end, the invention relates to an ejection device of the aforementioned type, further comprising at least one adjustment wedge mounted on the pushing device, said adjustment wedge comprising an adjustment surface forming an adjustment angle with respect to a direction substantially perpendicular to the first axis, the transmission chain being mounted on said adjustment surface so that the sliding direction is substantially parallel to said adjustment surface.

Thus, the adjustment wedge allows the sliding angle of the transmission links to be easily adjusted relative to each other by selecting the adjustment angle of the adjustment surface on which the transmission chain is slidably mounted. If the sliding angle needs to be changed, all that is needed is to provide another wedge with an adjustment surface forming the desired angle and mount this new wedge on the pushing device. Thus, the sliding angle can be changed easily without the need to modify the pushing device itself.

According to various embodiments, the ejection device may include other optional features, taken alone or in any technically feasible combination:
- the adjustment angle is negative to delay the movement of the ejection element relative to the pushing device, positive to accelerate the movement of the ejection element relative to the pushing device, or zero to move the ejection element at the same speed as the pushing device;
- the transmission chain comprises a connecting link, mounted so as to be movable in translation on a transmission link on the one hand, the ejection element being mounted so as to be movable in rotation on said connecting link about an axis of rotation substantially perpendicular to the first and second axes;
- the connecting link comprises two deflection surfaces of the ejection element, the two deflection surfaces each extending from a central portion of the connecting link to an edge of said connecting link, the connecting link orienting with respect to the ejection element, the deflection surfaces allowing this orientation as a function of the angle of adjustment when the ejection element moves along the second axis between its retracted position and its ejection position;
- the two deflection surfaces of the connecting link are substantially symmetrical to each other with respect to the central part of the connecting link;
- the connecting link is connected to the ejection element by a connecting member articulated to the connecting link and the ejection element so as to allow rotation of the connecting link relative to the ejection element;
- the transmission chain comprises an adjustment link translationally mounted on a transmission link, the adjustment link comprising a positioning surface extending over the adjustment surface of the adjustment wedge so that the sliding direction between the adjustment link and the transmission link is substantially parallel to said adjustment surface;
- each link of the transmission chain comprises at least two sliding surfaces, arranged to slide on sliding surfaces of adjacent links, said sliding surfaces extending substantially parallel to the adjustment surface of the adjustment wedge;
- each link of the transmission chain is connected to at least one other link of the transmission chain by at least one connecting element arranged to allow translational movement of the links relative to each other; and the transmission links are identical to each other.

BRIEF DESCRIPTION OF THE DRAWINGS

Other aspects and advantages of the invention will become apparent upon reading the following description, given as an example and referencing the attached drawings, in which.

DETAILED DESCRIPTION

Figure 1:
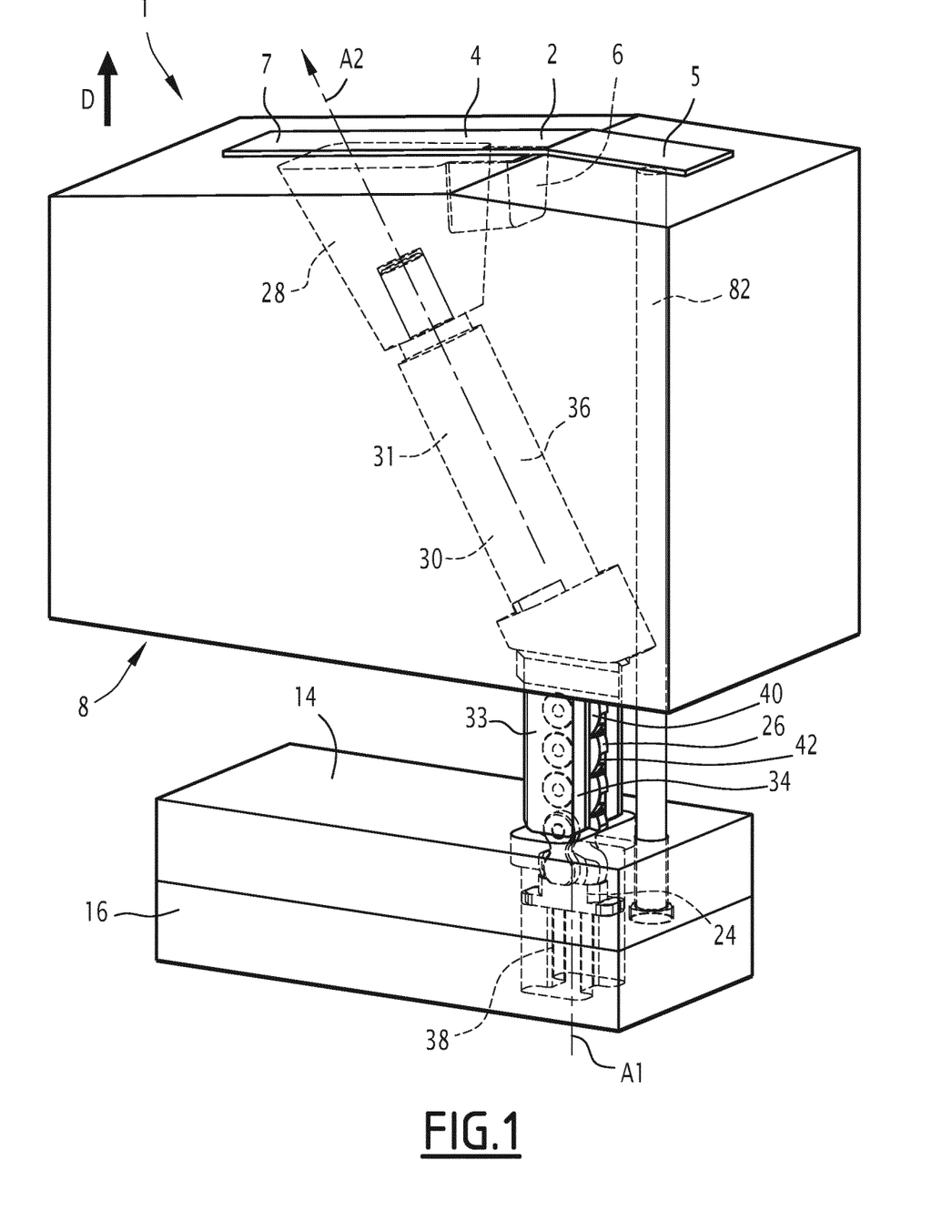
FIG. 1 is a schematic perspective view of a first mould part comprising an ejection device according to one embodiment of the invention, the ejection device being in the retracted position.

With reference to FIG. 1, a mould 1 for producing a moulded article 2 which can have any shape suitable for moulding is described. Such a production mould 1 is for example an injection mould, a compression mould, a foaming mould, or the like. More generally, a mould is used to impart a desired shape to a material disposed in a mould cavity having the desired shape of the article to be moulded.

The moulded article 2 is, for example, a motor vehicle part or the like. More particularly, according to the embodiment shown in the figures, the moulded article 2 comprises a main surface 4 and an undercut portion 6 with respect to the main surface, i.e. a portion comprising at least one surface which cannot be demoulded by simply moving two mould parts apart and which requires a complementary moulding element which is moveable in a direction different from the direction of moving the two mould parts apart.

The production mould 1 comprises a first part 8 and a second part (not shown for simplicity of the figures), movable relative to each other between an open position, in which the first and second parts are spaced apart from each other, and a closed position, in which the first and second parts are moved towards each other so as to define a closed main moulding cavity. The main moulding cavity has a shape complementary to the main surface 4 of the moulded article to be produced. The movement from the closed position to the open position takes place along an opening direction D, shown in the figures. The first part 8 comprises a moulding surface 10 defining, together with a moulding surface of the second part, the main moulding cavity when the first and second parts are in the closed position.

The main surface 4 of the moulded article 2 is such that it can be separated from the moulding surface 10 by movement of the moulded article in a single ejection direction, for example parallel to the opening direction D. Therefore, the main surface 4 is not necessarily flat and may have any shape which allows demoulding by moving the moulded article 2 in the direction of ejection. Thus, according to the embodiment shown in the figures, the main surface 4 comprises a first portion 5 substantially perpendicular to the opening direction D and a second portion 7 inclined with respect to the first portion 5. It should be noted that the main moulding cavity could also be arranged to form elements extending from the main surface 4, for example ribs, as long as these elements can also be separated from the main moulding cavity by moving the moulded article 2 in the direction of ejection.

According to the embodiment shown in the figures, the main moulding cavity is in fluid communication with a secondary moulding cavity defined by the moulding surface 10 of the first part 8 and by a complementary moulding surface 12 carried by an ejection device, as will be described later. The complementary moulding cavity has a shape complementary to the undercut portion 6 of the moulded article 2. The main moulding cavity and the secondary moulding cavity together form the moulding cavity of the production mould 1. It is understood that a plurality of secondary moulding cavities may be provided depending on the shape of the article to be moulded.

The mould 1 is for example an injection mould arranged to inject a plastic material at a predetermined pressure into the mould cavity. To this end, the production mould 1 comprises all the means for carrying out and controlling this injection and the formation of the part, such as one or more injection nozzles for the plastic material, means for regulating the temperature of the moulding cavity, means for actuating and moving the first and second parts of the production mould 1, etc. As such means are known, they will not be described in greater detail here.

Figure 5:
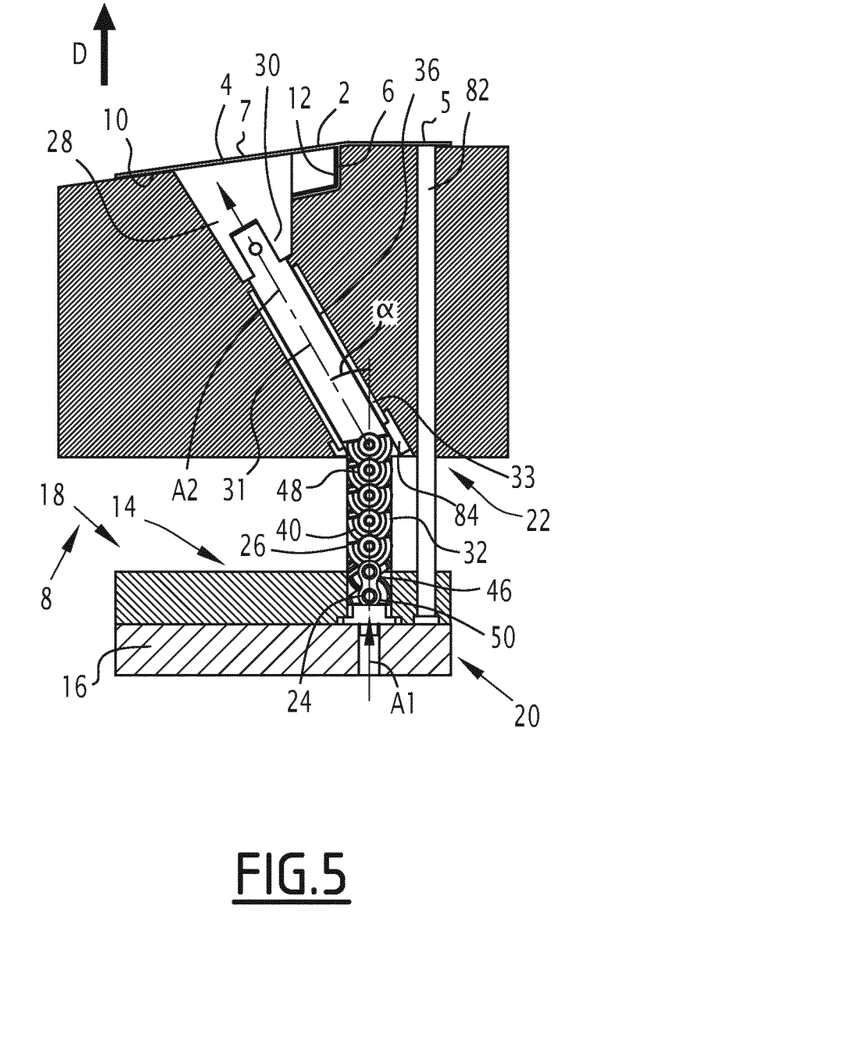
Figure 7:
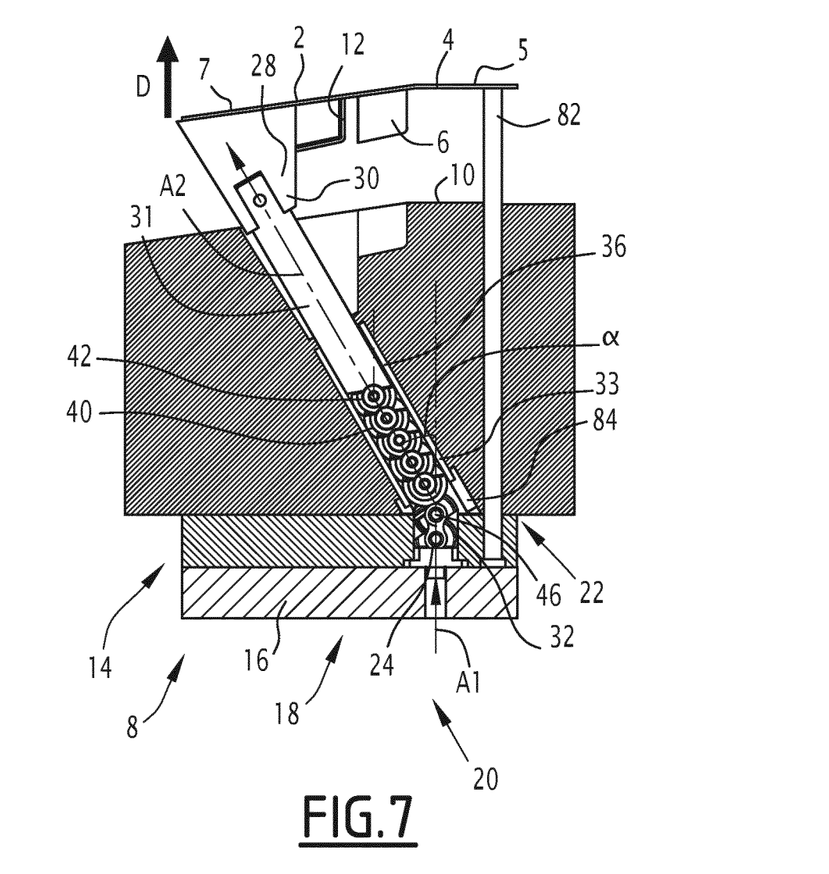

The production mould 1 includes an ejection device arranged to facilitate the removal of the moulded article 2 from the production mould after its production. Once the moulded article 2 has been produced, the first and second parts of the mould are moved to the open position. The moulded article 2 then lies against the moulding surface of the first part 8, as shown in FIGS. 1 and 5, and the ejection device is arranged to move the moulded article 2 away from the moulding surface 10, as shown in FIG. 7, to enable the moulded article 2 to be gripped and removed from the production mould. It should be noted that the ejection device can be actuated during the opening of the mould 1 so that the ejection of the moulded article 2 does not necessarily start when the mould is already in the open position.

The ejection device comprises a pushing device 14 which is translatable in the first part 8 along a first axis A1 between a retracted position, shown in FIGS. 1 and 5, and an ejection position, shown in FIG. 7. The first axis A1 extends in the ejection direction and is, for example, substantially parallel to the opening direction D so that, in the ejection position, the moulded article 2 is moved away from the moulding surface 10 into the space between the first mould part 8 and the second mould part.

The pushing device 14 comprises at least one ejection plate 16 arranged in a space 18 of the first part 8 so as to be translatable along the first axis A1. In the retracted position, the ejection plate 16 is disposed in an upstream portion 20 of the space 18, i.e. the portion of the space 18 furthest from the moulding surface 10, and in the ejecting position, the ejection plate 16 is disposed in a downstream portion 22 of the space 18, i.e. the portion of the space 18 closest to the moulding surface 10.

The pushing device 14 further comprises an actuating element 24 which is movably connected to the ejection plate 16, the actuating element 24 is connected to a transfer device 26 which is connected to an ejection element 28.

The ejection element 28 is translatable along a second axis A2 different from the first axis A1. According to the embodiment shown in the figures, the ejection element 28 is a movable block carrying the complementary moulding surface 12. Thus, in the retracted position, the block is arranged in the first part 8 so that the complementary moulding surface 12 extends opposite the moulding surface 10 of the first part 8 and defines with it the complementary moulding cavity. The movable block comprises an actuating end 30. The ejection element 28 further comprises an actuating rod 31 connected, by its downstream end, to the actuating end 30 of the movable block and extending along the second axis A2. The upstream end of the actuating rod 31 is connected to the transfer device 26, as will be described later. It should be noted that the actuating rod 31 could be made in one piece with the movable block. However, providing a movable block and an actuating rod 31 formed from two separate parts improves the adaptability of the ejection element 28 to different moulds, as will be described later.

The second axis A2 forms an angle $\alpha$ with the first axis A1. The value of the angle $\alpha$ is chosen according to the shape of the moulded article. More particularly, in the case where the moulded article comprises an undercut area 6, the angle $\alpha$ depends on the distance required to move the movable block out of the undercut area 6 during the ejection of the moulded article 2, as will be described later.

Thus, the ejection element 28 is movable between a retracted position and an ejection position, respectively when the pushing device 14 is in the retracted position and in the ejection position via the transfer device 26 which is arranged to transform the movement of the pushing device 14 along the first axis A1 into the movement of the ejection element 28 along the second axis A2, as will now be described.

The transfer device 26 comprises a guide element 33 extending in the first mould part 8 from the space 18 to the moulding surface 10 along a path extending along the first axis A1 in the space 18 and along the second axis A2 in the part of the first mould part 8 extending between the space 18 and the moulding surface 10. The guide element 33 comprises a first segment 32, for example formed by two profiles 34, extending into the space 18 along the first axis A1 and defining, for example between the two profiles 34, a first guide groove or slide. The guide element 33 also comprises a second segment 36, for example formed by a tube, extending in the first part 8 between the space 18 and the moulding surface 10 along the second axis A2, and defining, for example in the internal volume of the tube, a second guide groove or slide. The guide element 33 is fixed with respect to the first mould part 8.

It should be noted that the ejection plate 16 is translatable relative to the guide element 33. For this purpose, the ejection plate 16 comprises a recess 38 arranged to receive the two profiles 34 of the first segment 32. This recess 38 is able to slide around and along the first segment 32, allowing the ejection plate 16 to be moved between its retracted position and its ejection position, as will be described later.

The transfer device 26 further comprises a transmission chain 40 connected on the one hand to the pushing device 14 and on the other hand to the ejection element 28. The transmission chain 40 comprises at least two interconnected transmission links 42 that are translatable relative to each other. The translation of the transmission links 42 takes place along sliding surfaces 44, the sliding surfaces 44 being substantially parallel to each other. The transmission links 42 are also translatable relative to the pushing device 14 and the ejection element 28. For this purpose, each transmission link 42 comprises at least two sliding surfaces 44, one forming a translational surface with an adjacent transmission link 42 and the other forming a translational surface with an adjacent transmission link 42 or with an adjustment link 46 or with a connecting link 48, as will be described later. The length of the sliding surfaces 44 is such that the transmission links 42 do not disengage from each other when the ejection device is moved between its retracted and ejected positions. In addition, these sliding surfaces 44 are of sufficient length to be able to transmit the thrust forces from the ejection plate 16 to the ejection element 28.

Each sliding surface 44 forms an angle $\beta$ with a direction perpendicular to the first axis A1, as shown in FIGS. 8 to 12. By adjusting the angle $\beta$ with respect to the first axis A1, it is possible to adjust the lead or delay of the movement of the ejection element 28 with respect to the movement of the pushing device 14, as will be described later.

The number of transmission links 42 in the transmission chain 40 depends on the path followed by the transmission links 42 in the guide element 33 and is arranged so that the transmission chain 40 connects the pushing device 14 to the ejection element 28. More particularly, the transmission chain 40 connects an adjustment wedge 50 integral with the ejection plate 16 to the upstream end of the actuating rod 31. The adjustment wedge 50 will be described later.

Thus, the transmission chain 40 may comprise more than two transmission links 42, of which two end transmission links are connected to an adjustment link 46 and a connecting link 48 respectively, and at least one intermediate transmission link connected to the two end transmission links or a plurality of transmission links connected successively to each other so as to form the transmission chain 40 from the adjustment link 46 to the connecting link 48.

All the transmission links 42 are identical, i.e. they have an identical shape and structure, whether they are end transmission links or intermediate transmission links.

Several shapes of transmission links 44 can be envisaged. One of these shapes will be described below and the skilled person may refer to EP-3 210 735 for other examples of possible shapes. Whatever shape is chosen, it must be adapted so that the transmission links 42 can mate with each other and with the guide element 33 over the entire movement path of the transmission links 42 so that the transmission links 42 are guided in the guide element 33 over the entire movement path.

For this purpose, each transmission link comprises at least one guide surface 52 arranged to mate with the first and second guide grooves of the first and second sections 32 and 36 of the guide element 33 over the entire travel path of the transmission chain 40. "Mate" means that the guide surface 52 is in sliding, sliding and/or rolling contact with one of the guide grooves throughout the entire path of movement of the transmission link 42 carrying this guide surface 52. Thus, when the transmission link 42 is in the first segment 32 of the guide element 33, the guide surface 52 is in contact with at least one surface of the first guide groove and when the transmission link 42 is in the second segment 36, the guide surface 52 is in contact with at least one surface of the second guide groove. According to the embodiment shown in the figures, the guide surface 52 is formed by a roller 54 having a diameter substantially equal to the width of the guide grooves. The roller 54 is, for example, mounted on an axle extending from the transmission link 42 and fixed with respect to this transmission link. The shaft has, for example, a substantially circular cross-section. The cylindrically shaped peripheral surface 54 forms the guide surface by being in sliding contact with the walls of one of the guide grooves on at least two points on the surface. In one embodiment, each transmission link comprises two rollers 54 arranged to mate respectively with one of the profiles 34 or tube forming the first segment 32 and the second segment 36. In one embodiment, the rollers 54 are also rotatable relative to the transmission links, so that the guide surface 52 can also roll on the walls of the guide grooves. This ensures that the transmission links are effectively guided in the guide element 33, thus avoiding the risk of the ejection device jamming or getting stuck due to a transmission link 42 jamming in the guide element 33. It should be noted that the guide surface 52 could be defined directly by the shape of the transmission link 42 without the need for the addition of a roller, as this shape could be arranged to define a sliding contact with the guide element 33.

As previously mentioned, in order to ensure the translational movement of the links relative to each other and to the adjustment link 46 and to the connecting link 48, each transmission link 42 comprises two sliding surfaces 44, each formed by a wall of the transmission link 42. The walls forming the sliding surfaces 44 can be arranged in different ways as long as they are complementary and allow translational movement relative to each other. According to the embodiment shown in the figures, each transmission link 42 has, in a plane perpendicular to the first axis A1 and to the second axis A2, an S-shaped cross-section. Thus, each transmission link 42 comprises two outer branches and one inner branch connected to each other so as to define two slots, each extending between the inner branch and one of the outer branches and opening in two opposite directions. The opposing walls of the outer and inner branches each define a sliding surface 44. Thus, each transmission link has six sliding surfaces 44 defined by the facing walls of each slot and by the outer surfaces of the outer branches of the transmission link 42. Such an embodiment ensures a robust connection between the transmission links 42, as each transmission link 42 is held in two slots of adjacent links, including for the end transmission links, as will be described later. Each sliding surface 44 extends in a sliding direction and all sliding surfaces 44 are parallel to each other.

Figure 2:
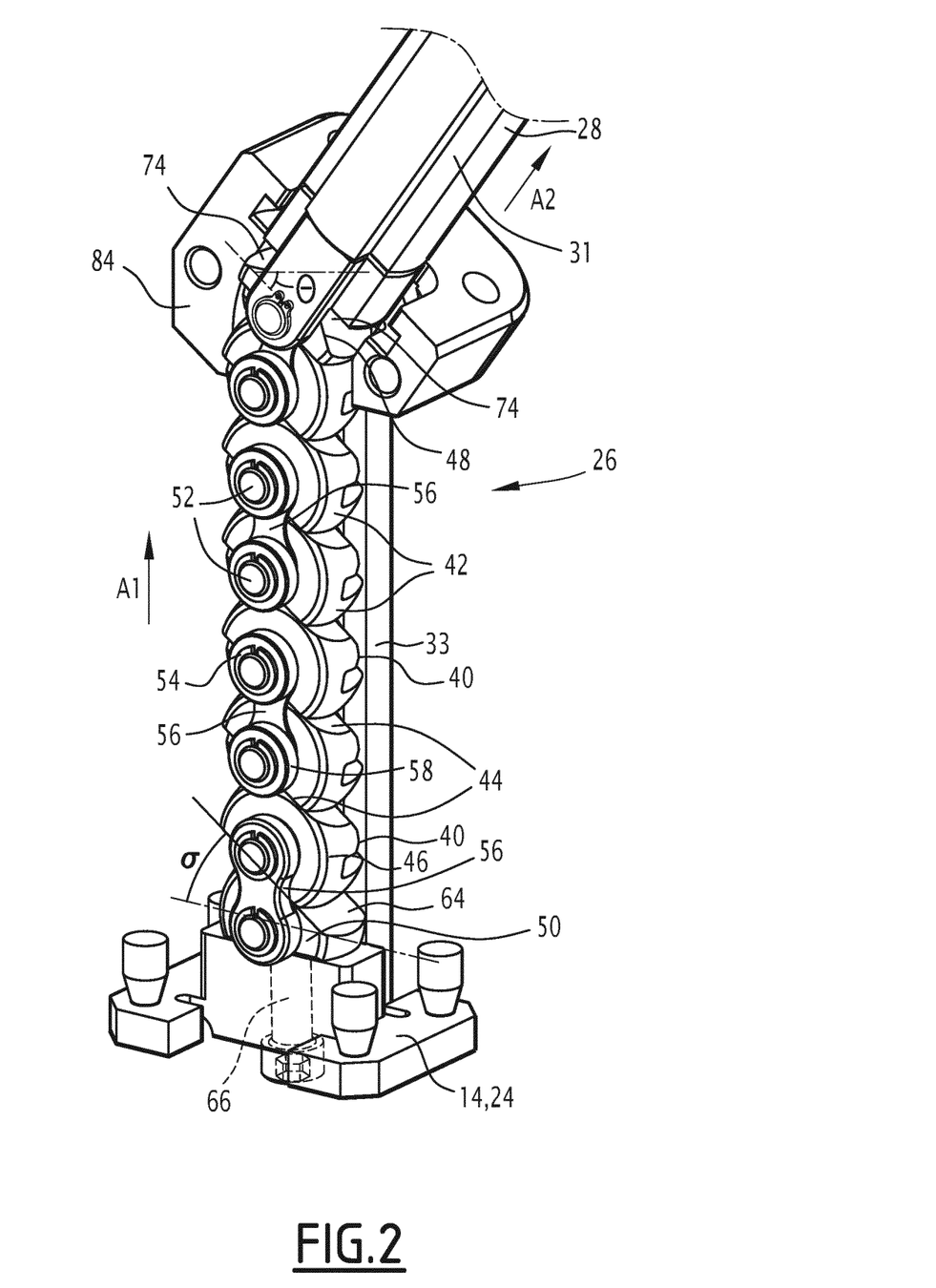
FIG. 2 is a schematic perspective view of a part of the ejection device of FIG. 1.

According to the embodiment shown in FIG. 2, the transmission links 42 are further connected in pairs by connecting elements 56. Each connecting element 56 is articulated to two transmission links 42 so as to allow translational movement of the two transmission links 42 linked to each other while preventing disengagement of the transmission links 42 from each other, in particular when the transmission chain 40 is not mounted in the production mould. In other words, the connecting member 56 is adapted to allow the sliding surfaces 44 of two transmission links 42 to slide over each other while keeping the transmission links 42 from separating when the transmission chain is manipulated outside the mould, for example when assembling and mounting it in the mould. Such a connecting element 56 is for example formed by a link comprising two opposite ends 58, which are each articulated to one of the transmission links 42 connected by the connecting element 56. More particularly, each end 58 comprises for example an opening, for example of oblong shape, receiving, in a rotatable manner, the circular-shaped axle carrying the roller 54 of a transmission link 42. A clearance is allowed between the axle and the connecting element to allow the links to move relative to each other. According to one embodiment, the outer surface of the ends 58 also form a guide surface 52 of the transmission links 42 in the guide member 33, as described above. In one embodiment, the connecting member 56 is formed by a flexible member connected at each end to one of the transmission links 40 connected by the connecting member 56. It is understood that a transmission link 42 may be connected to an adjacent transmission link 42 by a connecting element 56 and to another adjacent link by another connecting element 56 by providing projecting pins on either side of the links of the transmission chain 40. Such connecting elements 56 are described in FR-3 065 388 and the person skilled in the art will be able to refer to it to see other examples of possible embodiments.

As previously mentioned, the transmission chain 40 comprises two end transmission links 42, one of which is connected to an adjustment link 46 and the other to a connecting link 48. More particularly, the end transmission link 42 closest to the ejection plate 16 is linked to the adjustment link 46 and the end transmission link 42 closest to the actuator rod 31 is linked to the connecting link 48.

Figure 3:
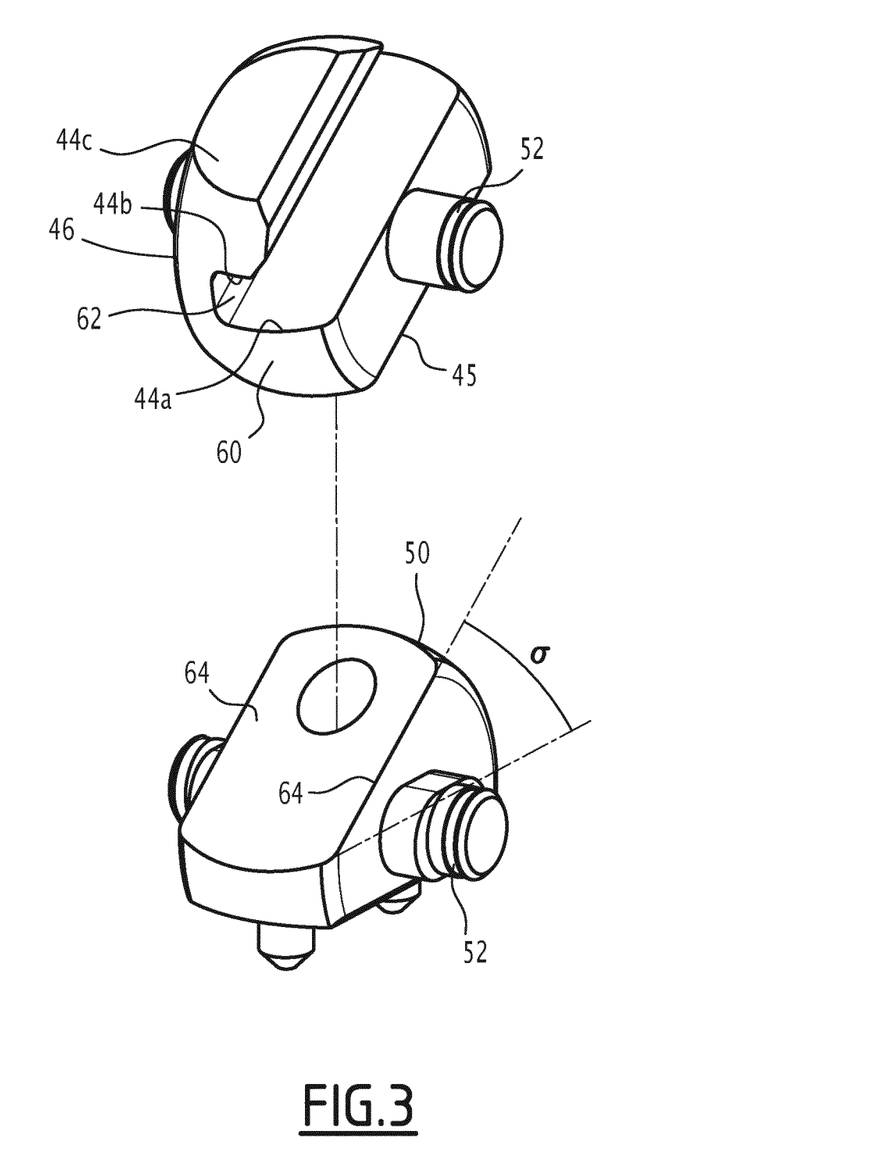
FIG. 3 is a schematic perspective view of an adjustment wedge and adjustment link of the ejection device of FIG. 2.

The adjustment link 46 ensures the mating of the transmission chain 40 with the pushing device 14 via the adjustment wedge 50. As shown in FIG. 3, the adjustment link 46 has the shape of a half transmission link 40. Thus, the adjustment link 46 has on one side a half-S shape formed by an outer branch 58 and an inner branch 60 defining between them a slot 62. The slot 62 allows the adjustment link 46 to be engaged with the end transmission link 42 and to be translatable relative thereto, in the same way that two transmission links 42 mate with each other. Thus, the outer branch 58 is inserted into a slot of the end transmission link 42 and the slot 62 receives an outer branch of this end transmission link 42. The outer branch 58 and the inner branch 60 thus define three sliding surfaces 44a, 44b, 44c in sliding contact with three sliding surfaces 44 of the end transmission link 42. The adjustment link 46 may further be connected to the end transmission link 42 by a connecting element 56, as described above. On the side of the inner branch 60 opposite the slot 62, the adjustment link 46 comprises a positioning surface 45 parallel to the sliding surfaces 44a, 44b, 44c of the adjustment link 46. The positioning surface 45 is arranged to be applied to an adjustment surface 64 of the adjustment wedge 50, as will now be described.

The adjustment wedge 50 is mounted on the pushing device 14 in a reversible manner, i.e. the adjustment wedge 50 can be removed from the pushing device 14 in order to replace it with another adjustment wedge. For this purpose, the adjustment wedge 50 is, for example, screwed to the actuating element 24 by means of a screw 66, as shown in FIG. 2. The adjustment surface 64 is arranged to form an adjustment angle σ with respect to a direction substantially perpendicular to the first axis A1 when the adjustment wedge 50 is mounted on the actuating member 24, as shown in FIGS. 2 and 3. Thus, by applying the positioning surface 45 of the adjustment link 46 to the adjustment surface 64, the positioning surface 45 of the adjustment link 46 is required to form an angle equal to the adjustment angle a with a direction substantially perpendicular to the first axis A1. As the sliding surfaces 44a, 44b, 44c of the adjustment link 45 and the sliding surfaces 44 of the transmission links 42 are parallel to the positioning surface 45 of the adjustment link 46, these sliding surfaces 44 thus form an angle equal to the adjustment angle σ with a direction substantially perpendicular to the first axis A1. In other words, the angle β is equal to the adjustment angle σ and the sliding direction is parallel to the adjustment surface 64. Thus, by choosing the value of the adjustment angle σ, the angle β formed by the sliding surfaces 44 of the transmission chain 40 with respect to a direction substantially perpendicular to the first axis A1 is adjusted, and by changing the adjustment angle σ by replacing the adjustment wedge 50 with another, it is possible to modify the angle β. Therefore, by changing a single part of the ejection device, it is possible to modify the behaviour of this ejection device when moving between the retracted position and the ejection position in order to adapt it to the moulded article 2 to be produced, as will be described later. Changing the adjustment wedge 50 for another one with a different angle of adjustment is particularly easy, as it is sufficient to unscrew the adjustment wedge 50 from the actuating element 24 and screw on another one with the desired angle of adjustment.

The positioning surface 45 is applied to the adjustment surface 64 in such a way that the adjustment link 46 is connected to the adjustment wedge 50 by a connecting element 56, which prevents a relative movement between the adjustment link 46 and the adjustment wedge 50, as shown in FIG. 2. For this purpose, the axis of the adjustment wedge 50 receiving an end 58 of the connecting member 56 is for example oblong in shape, substantially complementary to the oblong opening of the connecting member 56, in order to prevent relative movement between the adjustment link 46 and the adjustment wedge 50. For this purpose, the adjustment wedge 50 and the adjustment link 46 comprise at least one roller 54, as described above with reference to the transmission links 42. The rollers 54 also form guide surfaces 52, as also described above with reference to the transmission links 42.

Figure 4:
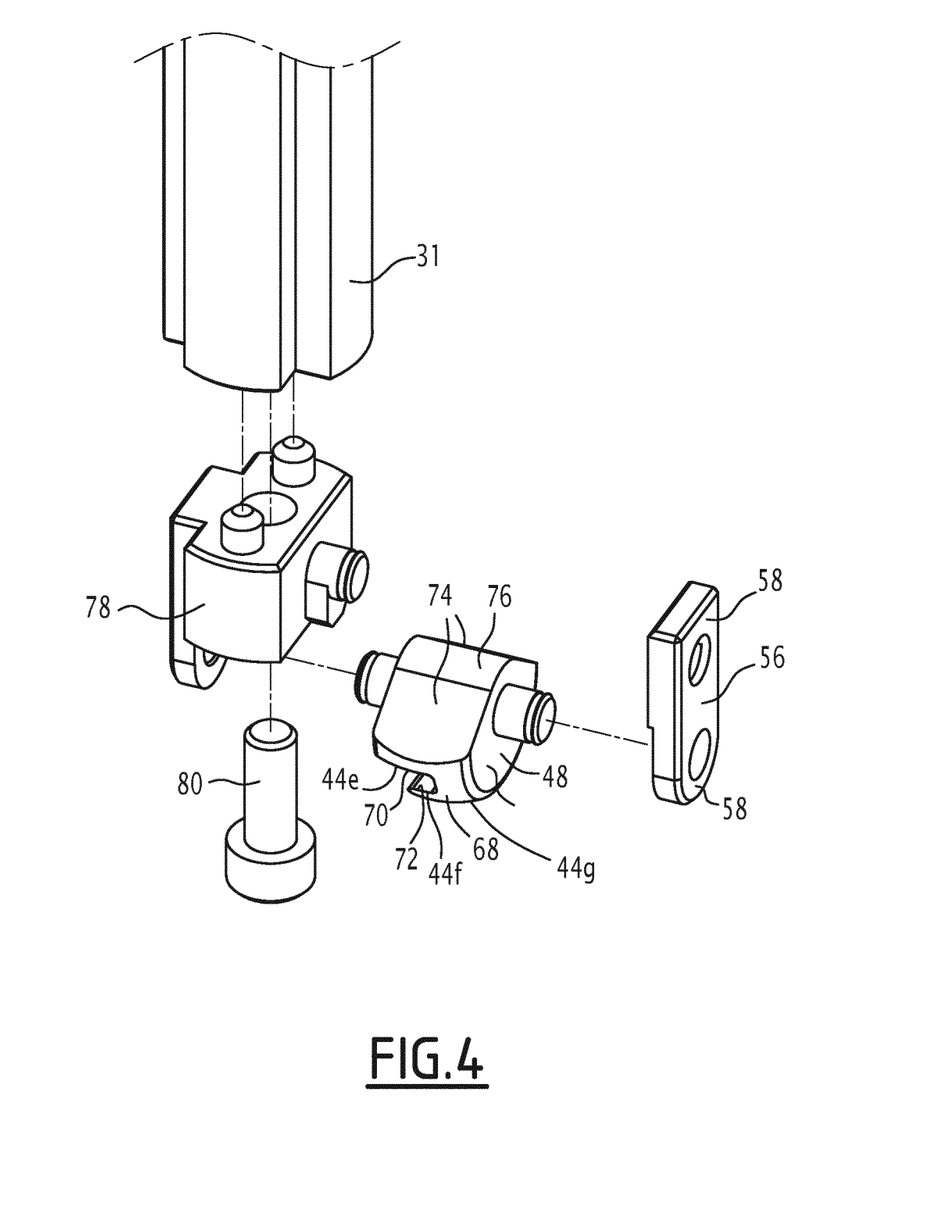
FIG. 4 is a schematic perspective view of a connecting link and ejection element of the ejection device of FIG. 2, FIGS. 5 to 7 are schematic cross-section views of the first mould part of FIG. 1, with the ejection device moving from the retracted position through an intermediate position to the ejection position.

The connecting link 48, more particularly shown in FIG. 4, connects the transmission chain 40 with the ejection element 28, and more particularly with the actuating rod 31. In particular, it is arranged to allow the actuating rod 31 to adapt to the selected adjustment angle σ. The connecting link 48, like the adjustment link 46, has on one side a half-S shape formed by an outer branch 68 and an inner branch 70 defining between them a slot 72. The slot 72 allows the connecting link 48 to be engaged with the end transmission link 42 and to be translatable relative thereto, in the same way that two transmission links 42 mate with each other. Thus, the outer branch 68 is inserted into a slot of the end transmission link 42 and the slot 72 receives an outer branch of this end transmission link 42. The outer branch 68 and the inner branch 70 thus define three sliding surfaces 44e, 44f, 44g in sliding contact with three sliding surfaces 44 of the end transmission link 42. The connecting link 48 may further be connected to the end transmission link 42 by a connecting element 56, as described above. On the side of the inner branch 70 opposite the slot 72, the connecting link 48 comprises two deflection surfaces 74 of the ejection element 28 extending on either side of a central portion 76 of the connecting link 48 and each converging towards an edge of the inner branch 70 from that central portion 76. By each converging towards an edge of the inner branch 70, it is meant that each deflection surface 74 is inclined between the central portion 76 and the corresponding edge of the inner branch 70 so that the connecting link 48 has a substantially triangular shape on the side of the inner branch 70 opposite the slot 72. Thus, each deflection surface 74 forms an angle ⊖ with the sliding surface 44e formed by the inner branch 70, the deflection surfaces 74 forming two sides of a triangle, the third side of which is formed by the sliding surface 44e. The angle formed by one of the deflection surfaces 74 is equal to the angle formed by the other deflection surface 74 so that the two deflection surfaces 74 are substantially symmetrical to each other with respect to the central portion 76. The angle ⊖ is also substantially equal, in absolute value, to the largest value envisaged for the chosen adjustment angle σ. The largest value envisaged thus corresponds to the adjustment wedge 50 with the largest adjustment angle which can be used with the production mould or with other production moulds, since the same ejection device can be used with different moulds. Thus, the connecting link 48 can be used with all the adjustment wedges 50 envisaged for the mould. In one embodiment, the angle ⊖ is substantially equal to 35°. The inclined deflection surfaces 74 free up a space under the ejection element 28 so that it can be oriented at the selected adjustment angle σ by rotation relative to the connecting link 48.

In one embodiment, the central portion 76 itself forms a deflection surface substantially parallel to the sliding surfaces 44e, 44f and 44g so that the connecting link 48 has a trapezoidal cross-section rather than a triangular cross-section on the side of the inner branch 70 opposite the slot 72. In one embodiment, however, the central portion 76 forms a curved surface with a radius concentric with the axis carrying the roller 54. Such a curved shape facilitates the rotation of the ejection element 28 relative to the connecting link 48, as will now be described.

The connecting link 48 is rotatable relative to the actuating rod 31, e.g. relative to a connecting piece 78 which is integral with the actuating rod 31 and fixed to it by a screw 80, as shown in FIG. 4. According to one embodiment, the actuating rod 31, and possibly the connecting piece 78, is not in direct contact with the deflection surfaces 74 and 76 of the connecting link 48 in order to limit friction between the ejection rod 31 and the connecting link 48. The connecting link 48 can be oriented with respect to the ejection device rod 31, the deflection surfaces 74 allowing such orientation depending on the value of the adjustment angle σ as will be described later. Thus, the connecting link 48 ensures the transition between the transmission chain 40 and the actuating rod 31 regardless of the value of the adjustment angle σ in order to ensure movement along the second axis A2 of the actuating rod 31 regardless of that value.

The connection between the connecting link 48 and the connecting part 78 is, for example, provided by a connecting element 56 as described above. To this end, the connecting part 78 and the connecting link 48 comprise at least one pin extending from the connecting link 48 and the connecting part 78, on which pins a roller 54 may be mounted, as described above with reference to the transmission links 42. The rollers 54 also form guide surfaces 52, as also described above with reference to the transmission links 42.

The ejection device may further comprise one or more ejection rods 82 extending in directions parallel to the first axis A1, as shown in FIGS. 1 and 5 to 7. One end of the ejection rod 82 is integral with the ejection plate 16 and its other end is flush with the moulding surface 10 in the retracted position of the ejection device and forms part of the moulding surface 10, as shown in FIGS. 1 and 5. The ejection rod(s) 82 are arranged to allow ejection of the moulded article 2 in the direction of the mould opening, as will now be described.

The operation of the ejection device described above will now be described.

During the moulding of the article, the mould is in the closed position and the ejection device is in the retracted position, in which the ejection plate 16 is in the upstream part 20 of the space 18, the ejection rod 82 is flush with the moulding surface 10 and in which, according to the embodiment shown in the figures, the ejection element 28 defines with the first part 8 the secondary moulding cavity by its secondary moulding surface 12.

Once the article has been produced, the mould is opened by moving the first and second mould parts away from each other in the opening direction D. During or after this opening, the ejection device is actuated from its retracted position to its ejection position.

Figure 6:
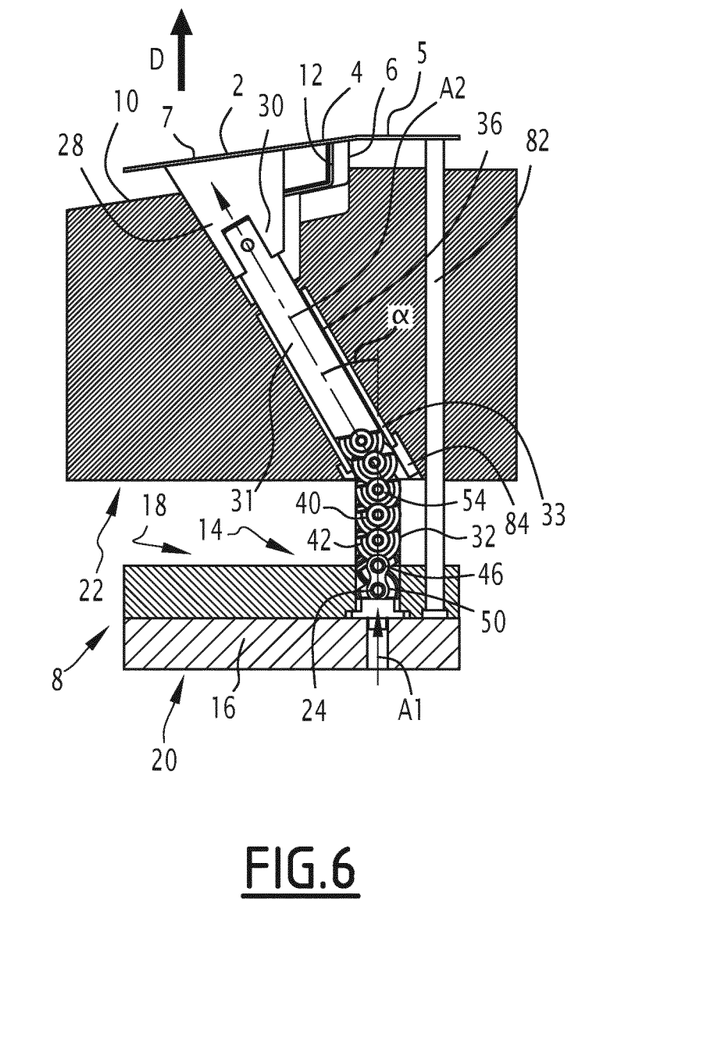

To do this, the ejection plate 16 is actuated to move into the space 18 towards the downstream part 22 of the space 18, as shown in FIG. 6. During this movement, the ejection plate 16 moves along the first axis A1 by sliding around the first segment 32 of the guide element 33, this first segment 32 entering the recess 38 of the ejection plate 16 provided for this purpose.

The movement of the ejection plate 16 causes the ejection rod 82 to move in a direction parallel to the first axis A1, thereby moving the moulded article 2 away from the moulding surface 10 in that direction, as shown in FIG. 6.

In addition, the movement of the ejection plate causes the adjustment wedge 50 to move along the first axis A1, which in turn causes the transmission chain 40 to move within the guide element 33, the transmission chain 40 causing the ejection element 28 to move.

As shown in FIG. 1, in the retracted position, the transmission links 42 are initially located in the first segment 32 of the guide element 33. The movement of the ejection plate 16 causes the links 42 to move along the first axis A1 and progressively engage the second segment 36 and change direction to move along the second axis A2, as shown in FIG. 6. This change of direction is possible by the sliding surfaces 44 of the transmission chain links 40 sliding relative to each other.

The movement of the links along the second axis A2 results in a movement along this axis of the actuating rod 31 and the movable block. Due to the angle α between the first axis A1 and the second axis A2, the movement of the actuating rod 31 causes the movable block to slide out of the undercut area 6, as shown in FIG. 6, allowing this area to be demoulded. It should be noted that by adapting the value of the adjustment angle σ, and therefore of the angle β formed by the sliding surfaces 44, it is possible to delay or accelerate the movement of the movable block out of the undercut area 6 with respect to the movement of the pushing device 14. That is to say, for a movement at a given speed of the pushing device 14 along the first axis A1, the movable block will move at a higher speed, in the case of an accelerated movement, or lower, in the case of a delayed movement, than that given speed. By accelerating or delaying the movement of the movable block relative to the pushing device 14, the movement of the movable block can be synchronised with the movement of the ejection rod(s) 82 so that the movable block and the ejection rods 82 reach the ejection position at the same time even though the ejection device strokes are different.

Figure 8:
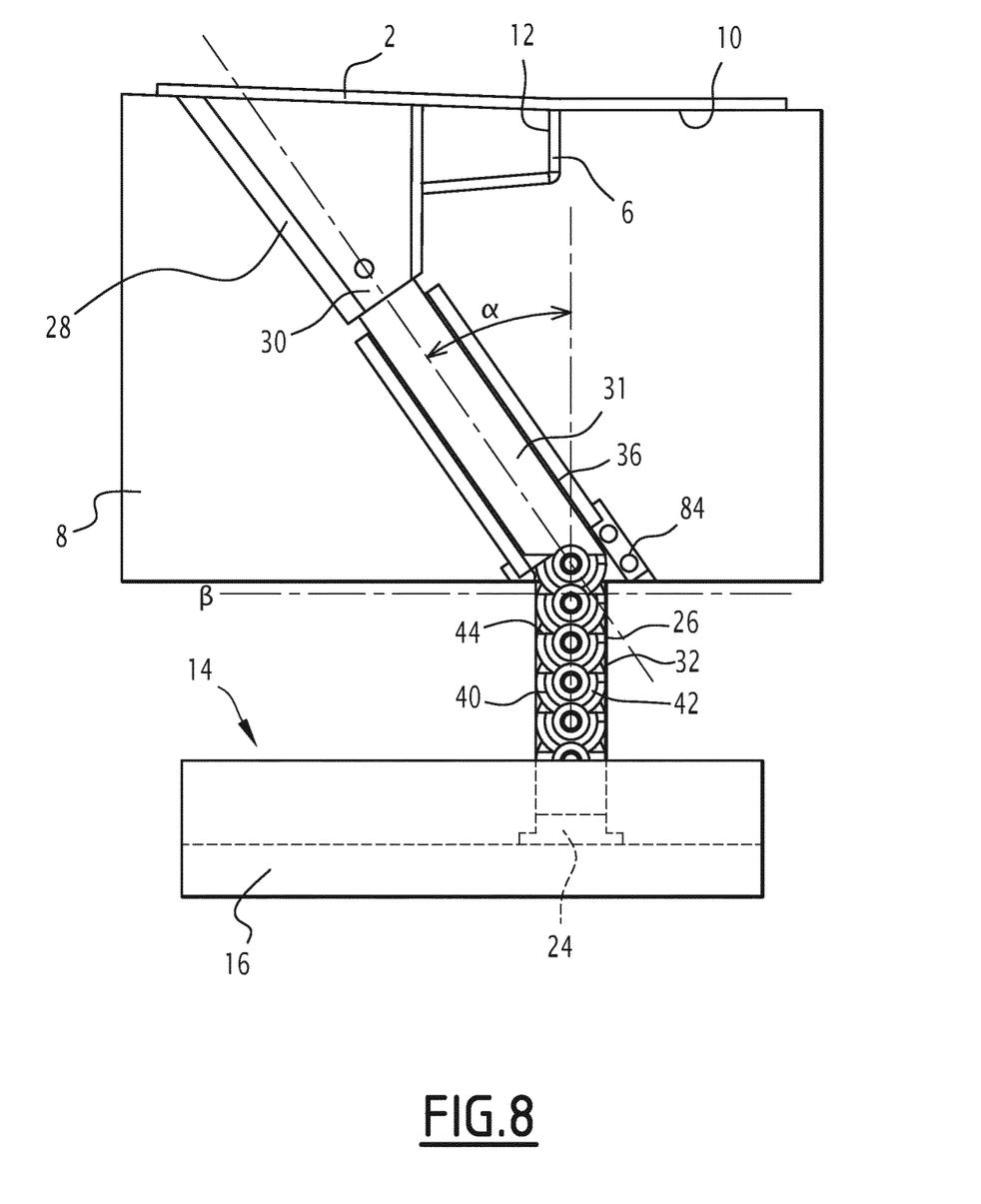
FIGS. 8 to 12 are schematic cross-sectional views of the first mould part, with the ejection device in the retracted position, and showing different movement paths of the ejection device.

In FIG. 8, the angle α is substantially equal to 30° and the adjustment angle σ is zero, i.e. the adjustment surface 64 of the adjustment wedge 50 extends substantially perpendicular to the first axis A1. In this case, the movable block moves at the same speed as the pushing device 14.

Figure 9:
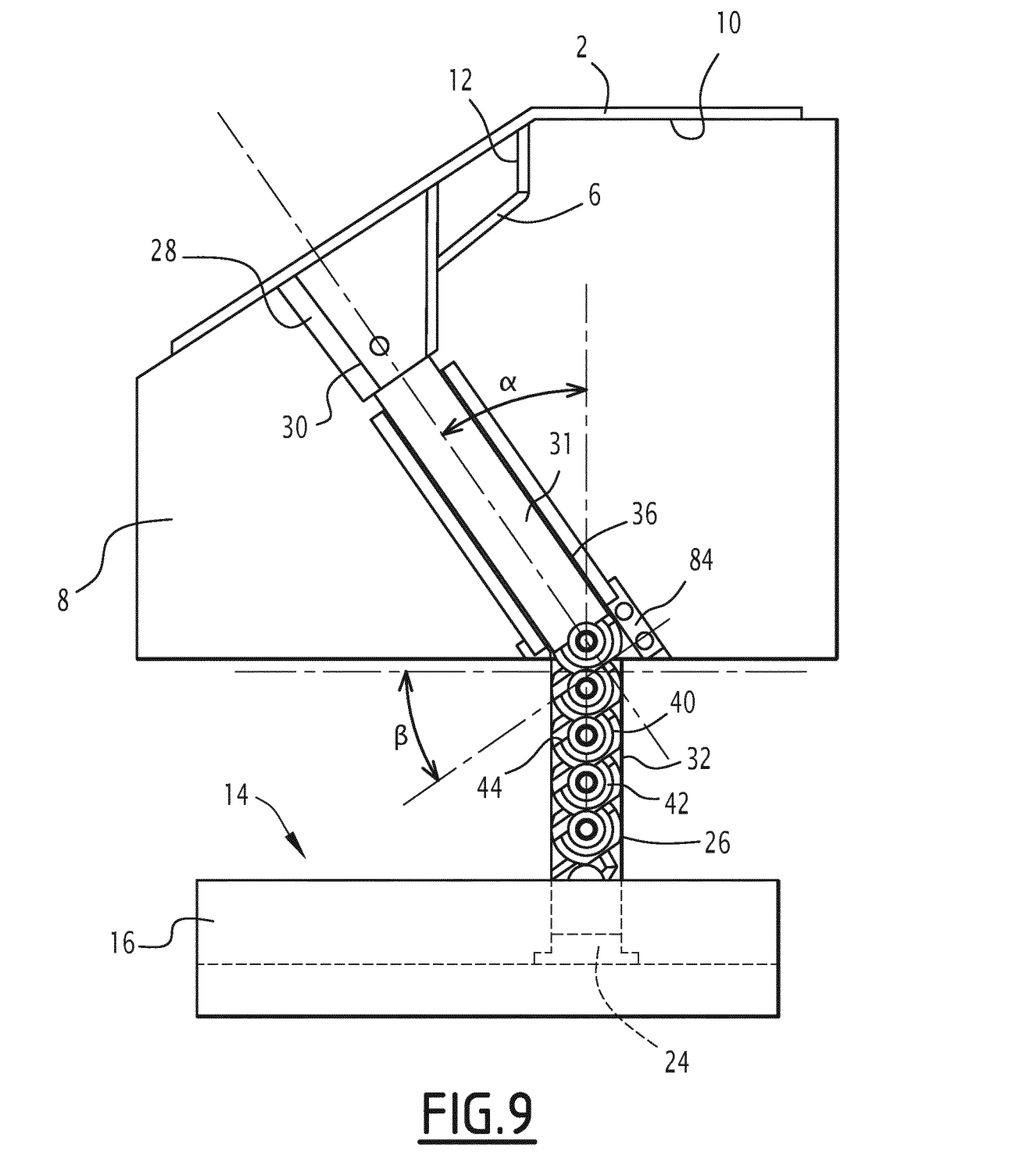

In FIG. 9, the angle α is approximately 35° and the adjustment angle σ is approximately −35°. In this case, the movable block moves at a speed slower than the speed of movement of the pushing device 14.

Figure 10:
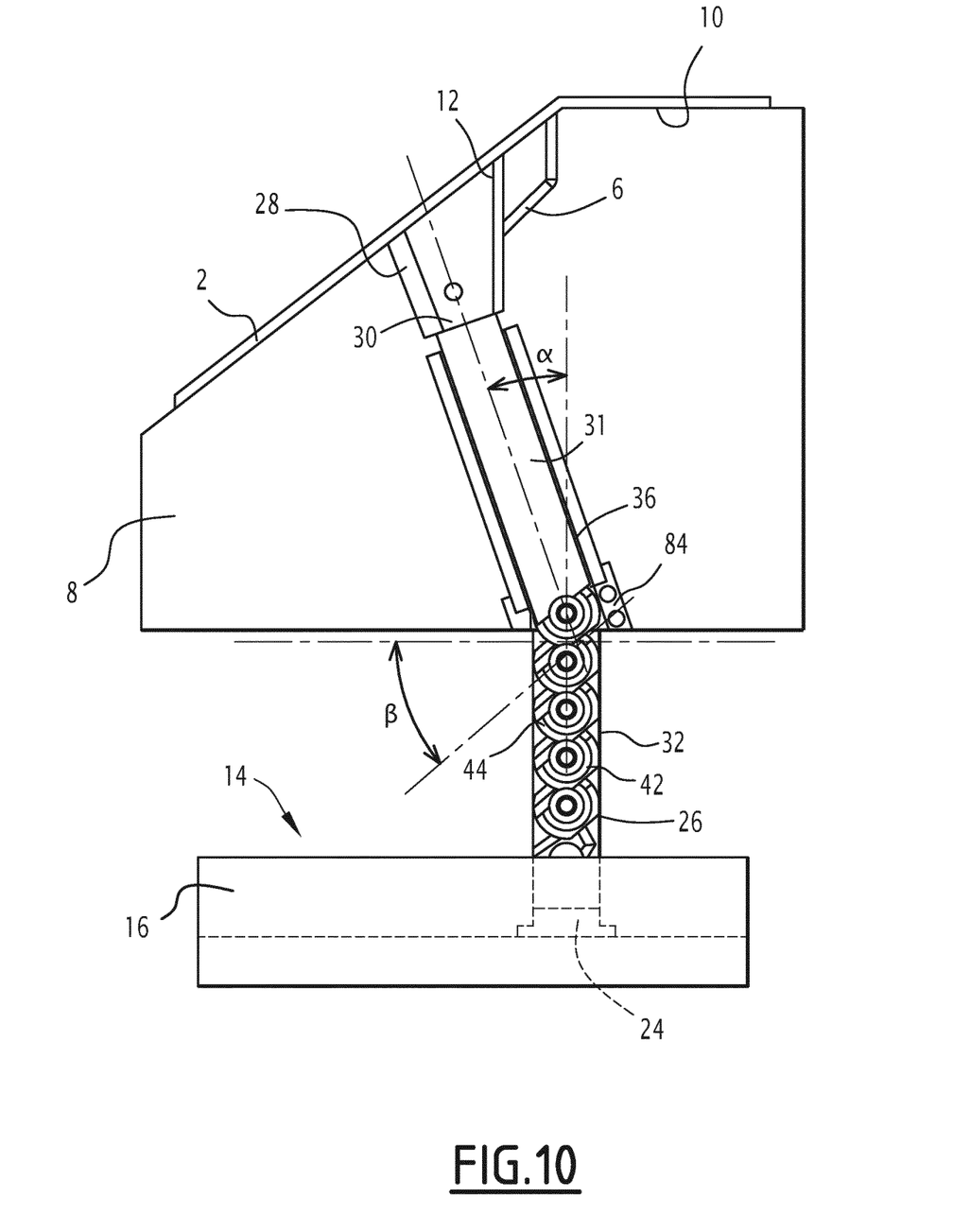

In FIG. 10, the angle α is approximately 20° and the adjustment angle σ is approximately −40°. In this case, the movable block moves at a speed slower than the speed of movement of the pushing device 14.

Figure 11:
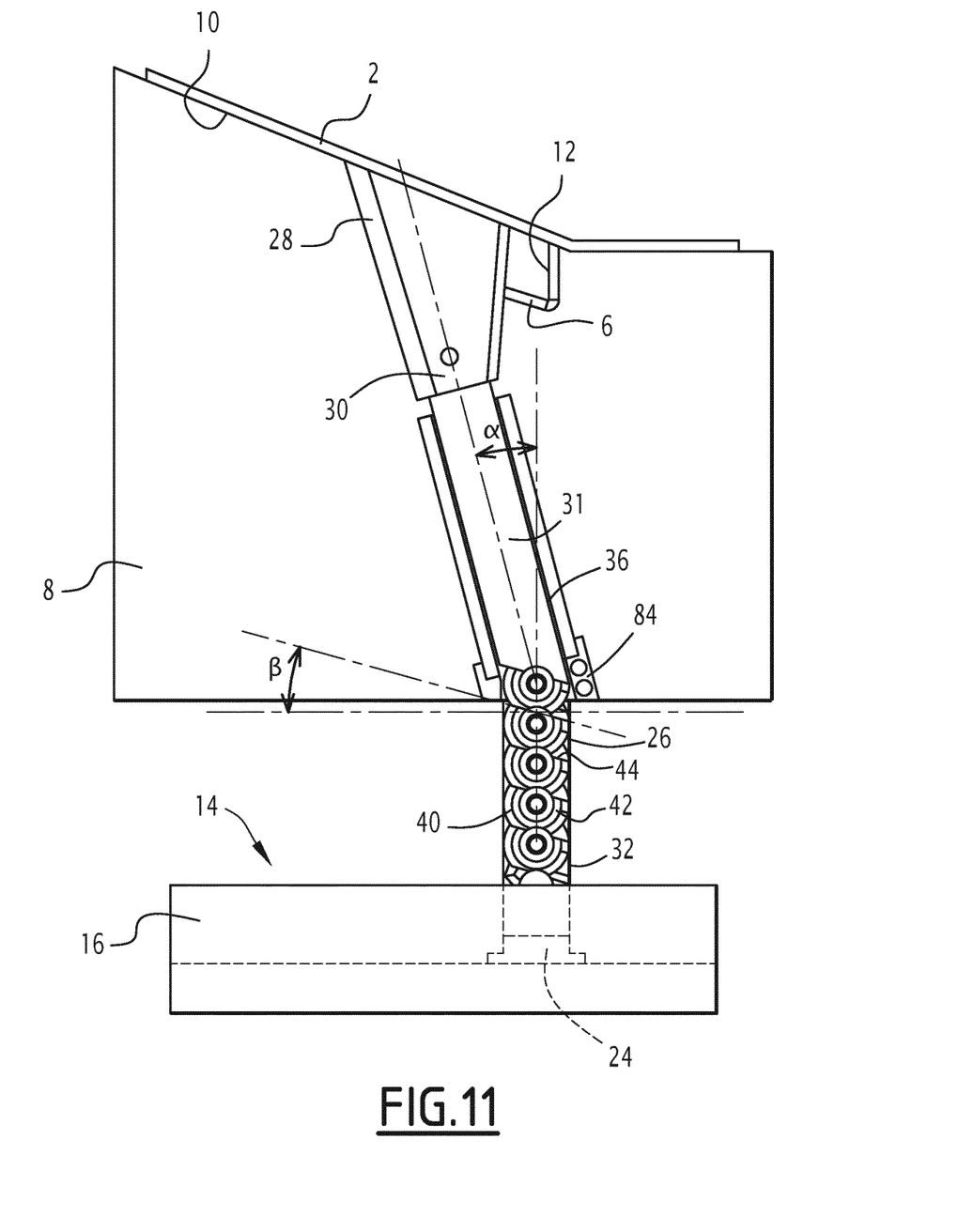

In FIG. 11, the angle α is approximately 1520 and the adjustment angle σ is approximately 20°. In this case, the movable block moves at a speed faster than the speed of movement of the pushing device 14.

Figure 12:
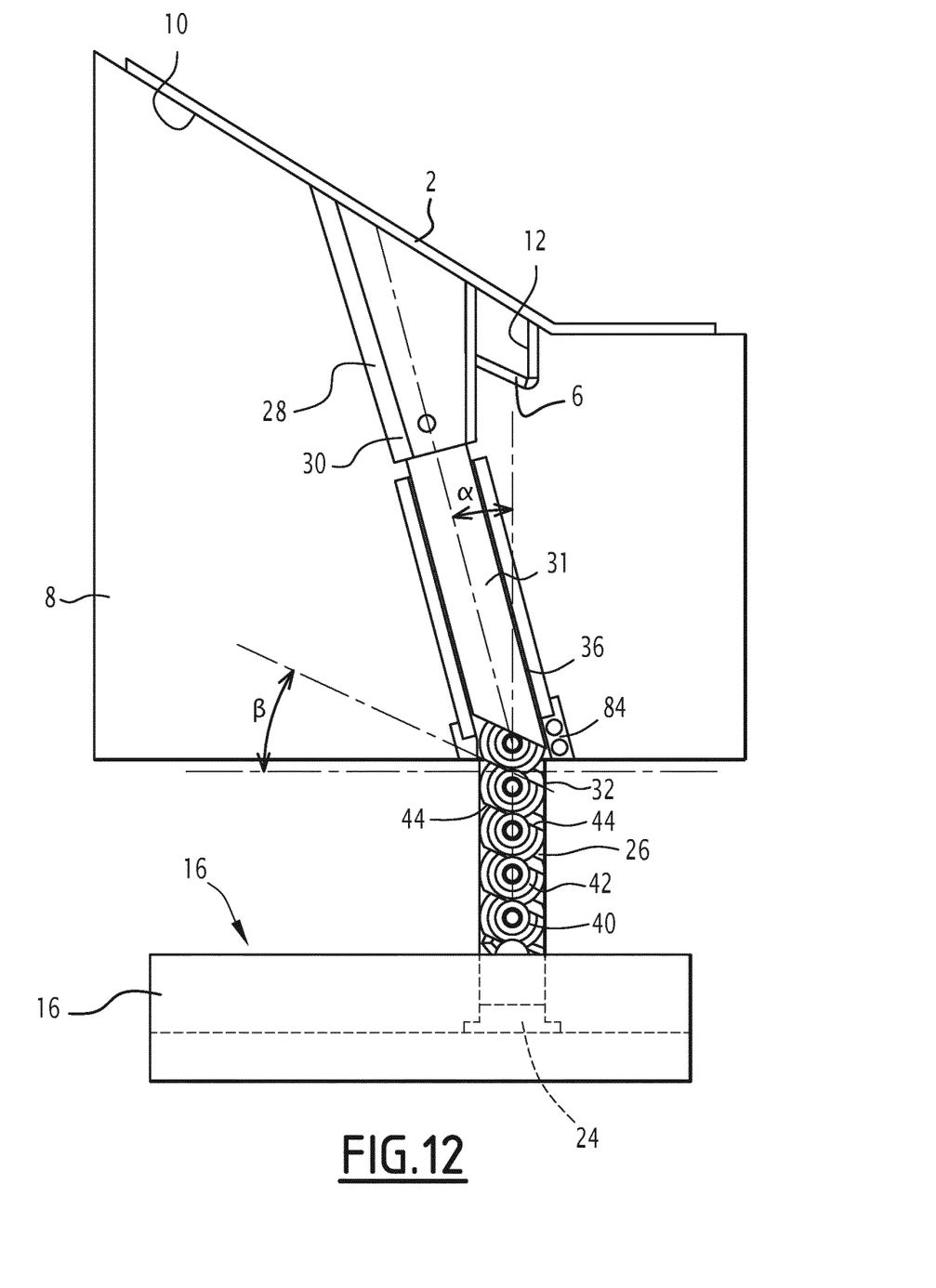

In FIG. 12, the angle α is approximately 15° and the adjustment angle σ is approximately 30°. In this case, the movable block moves at a speed faster than the speed of movement of the pushing device 14.

Thus, it is understood that by choosing a negative adjustment angle σ, the movement of the movable block is delayed and by choosing a positive adjustment angle σ, the movement of the movable block is accelerated. The adjustment angle is easily changed by replacing the adjustment wedge 50 with another one and possibly also replacing the connecting link 48, as described above. However, as described above, the same connecting link 48 can be used with the different wedges 50 that can be used in the mould.

When the ejection plate 16 reaches its ejection position, in which it is in contact with the upper wall of the space 18 of the first part 8, for example, as shown in FIG. 7, the moulded article 2 is completely separated from the moulding surface 10 and the movable block is completely removed from the undercut area 6. Thus, the moulded article 2 can be removed from the mould without obstruction and without interference with any of the parts of the mould and the ejection device.

The ejection device described above therefore allows the ejection of large and/or complex shaped moulded articles without weakening the first part of the mould 8. In addition, the transfer device can be used to adapt the ejection device to the shape of the moulded article 2. The transmission chain 40 can be easily modified by adding or removing transmission links 42, which are all identical and interchangeable. Furthermore, the angle α between the first axis A1 and the second axis A2 can be changed by simply changing an interface piece 84 interposed between the first segment 32 and the second segment 36. This interface piece 84 allows the second segment 36 to be more or less inclined with respect to the first segment 32. Thus, common elements of the ejection device, such as the transmission links 42, the actuating rod 31, the first and second sections 32, 36, the actuating element 24, the ejection plate 16 and the ejection rod(s) 82 can be used for different moulds. It is sufficient to change only the movable block when the shape of the secondary moulding surface 12 is to be changed and/or the interface piece 84 when the angle α is to be changed and/or the adjustment wedge 50 when the angle β is to be changed. It should be noted that previously the angle β was set by modifying the actuating rod 31 so that its interface with the transmission chain dictated the desired sliding direction. Thus, to change the angle β, it was necessary to change the actuating rod 31. The angle β is set by the adjustment wedge 50 and a single actuating rod 31 can thus be used regardless of the desired angle. The actuating rod 31 can therefore be easily machined to a constant length for different moulds.

The ejection device described above can be modified in a number of ways. Thus, by way of example, the ejection element 28 might not comprise a secondary moulding surface and only serve to separate the moulded article 2 from the moulding surface 10, in particular when the main surface 4 of the moulded article 2 has areas extending in directions different from a direction substantially perpendicular to the opening direction. The transmission links 42 could also be formed as simple blocks whose outer surfaces form the sliding and guiding surfaces. In such an embodiment, the links 42 are not directly connected to each other and are in simple sliding contact with each other.

In addition, it is understood that the mould could comprise a plurality of ejection elements 28 and corresponding transfer devices 26 to enable the moulding and ejection of a plurality of undercut areas 6 and/or the ejection of a plurality of complex shaped areas of the main surface 4. In this case, a single ejection plate carrying a plurality of adjustment wedges 50 can be provided to operate all ejection elements 28 simultaneously.

The invention claimed is:

1. An ejection device for a mould for making a moulded article in a moulding cavity for enabling ejection of the moulded article from the moulding cavity, said device comprising:
   a pushing device that can be moved in translation along a first axis between a retracted position and an ejection position,
   at least one ejection element that can move in translation along a second axis, different from the first axis, between a retracted position and an ejection position,
   at least one transfer device connecting the pushing device and the ejection element, said transfer device being arranged to move the ejection element along the second axis between its retracted position and its ejection position when the pushing device is moved along the first axis between its retracted position and its ejection position, the transfer device comprising a transmission chain comprising at least two transmission links that can be moved in translation in a sliding direction with respect to each other and with respect to the pushing device and ejection element,
   wherein the ejection device further comprises at least one adjustment wedge mounted on the pushing device, said adjustment wedge comprising an adjustment surface forming an adjustment angle with respect to a direction substantially perpendicular to the first axis, the transmission chain being mounted on said adjustment surface so that the sliding direction is substantially parallel to said adjustment surface,
   wherein said adjustment wedge comprises a lower surface extending in a direction perpendicular to the first axis and an upper surface forming the adjustment surface forming the adjustment angle with respect to said direction substantially perpendicular to the first axis, the lower surface being applied on the pushing device and the transmission chain being mounted on the upper surface.

2. The ejection device according to claim 1, wherein the adjustment angle is negative to delay the movement of the ejection element relative to the pushing device, positive to accelerate the movement of the ejection element relative to the pushing device, or zero to move the ejection element at the same speed as the pushing device.

3. The ejection device according to claim 1, in which the transmission chain comprises a connecting link, mounted so as to be movable in translation on a transmission link on the one hand, the ejection element being mounted so as to be movable in rotation on said connecting link about an axis of rotation substantially perpendicular to the first and second axes.

4. The ejection device according to claim 3, wherein the connecting link comprises two deflection surfaces of the ejection element, the two deflection surfaces each extending from a central portion of the connecting link to an edge of said connecting link, the connecting link orienting with respect to the ejection element, the deflection surfaces allowing this orientation as a function of the angle of adjustment when the ejection element moves along the second axis between its retracted position and its ejection position.

5. The ejection device according to claim 4, wherein the two deflection surfaces of the connecting link are substantially symmetrical to each other with respect to the central part of the connecting link.

6. The ejection device according to claim 3, wherein the connecting link is connected to the ejection element by a connecting member articulated to the connecting link and the ejection element so as to allow rotation of the connecting link relative to the ejection element.

7. The ejection device according to claim 1, wherein the transmission chain comprises an adjustment link translationally mounted on a transmission link, the adjustment link comprising a positioning surface extending over the adjustment surface of the adjustment wedge such that the sliding direction between the adjustment link and the transmission link is substantially parallel to said adjustment surface.

8. The ejection device according to claim 1, wherein each link of the transmission chain comprises at least two sliding surfaces, arranged to slide on sliding surfaces of adjacent links, said sliding surfaces extending substantially parallel to the adjustment surface of the adjustment wedge.

9. The ejection device according to claim 1, wherein each link of the transmission chain is linked to at least one other link of the transmission chain by at least one linking element arranged to allow translational displacement of the links relative to one another.

10. The ejection device according to claim 1, wherein the transmission links are identical to one another.

11. The ejection device according to claim 1, wherein the transmission chain comprises an adjustment link, the adjustment link comprising a positioning surface applied to the adjustment surface of the adjustment wedge, the adjustment link being connected to the adjustment wedge by a connecting element which is configured to prevent a relative movement between the adjustment link and the adjustment wedge.

* * * * *